United States Patent
Carney et al.

(10) Patent No.: US 8,482,755 B2
(45) Date of Patent: Jul. 9, 2013

(54) PRINT CONTROLLER USING A JOB DESPOOL TOKEN TO CONTROL THE RELEASE OF PRINT JOBS STORED IN A RASTERIZED JOB SPOOL

(75) Inventors: Dennis M. Carney, Louisville, CO (US); Charles D. Johnson, Boulder, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 2429 days.

(21) Appl. No.: 11/226,639

(22) Filed: Sep. 14, 2005

(65) Prior Publication Data

US 2007/0058192 A1    Mar. 15, 2007

(51) Int. Cl.
*G06F 3/12* (2006.01)

(52) U.S. Cl.
USPC ....... 358/1.15; 358/1.13; 358/1.14; 358/1.16; 715/205; 715/206; 715/207; 715/208

(58) Field of Classification Search
USPC ....................................................... 358/1.15
See application file for complete search history.

(56) References Cited

U.S. PATENT DOCUMENTS

| 6,707,563 | B1 | 3/2004 | Barry et al. |
| 2002/0021454 | A1 | 2/2002 | Johnson et al. |
| 2002/0080389 | A1 | 6/2002 | Carney et al. |
| 2002/0114004 | A1 * | 8/2002 | Ferlitsch ............... 358/1.15 |
| 2002/0171856 | A1 | 11/2002 | Ackerman et al. |
| 2004/0061892 | A1 | 4/2004 | Ferlitsch |
| 2004/0095596 | A1 * | 5/2004 | Rijavec ............... 358/1.15 |
| 2004/0160613 | A1 | 8/2004 | Kurotsu et al. |
| 2004/0169878 | A1 | 9/2004 | Toda et al. |
| 2004/0184067 | A1 * | 9/2004 | Suzuki ............... 358/1.15 |
| 2004/0190042 | A1 | 9/2004 | Ferlitsch et al. |
| 2005/0052662 | A1 | 3/2005 | Nishikawa et al. |
| 2006/0256358 | A1 * | 11/2006 | Chapman et al. ...... 358/1.13 |

FOREIGN PATENT DOCUMENTS

JP    2003296070    10/2003

* cited by examiner

*Primary Examiner* — Twyler Haskins
*Assistant Examiner* — Brendan McCommas
(74) *Attorney, Agent, or Firm* — Duft Bornsen & Fettig, LLP

(57) ABSTRACT

A print controller and associated methods are disclosed. Some print jobs received in the print controller are stored in a rasterized or ripped job spool. The release of these jobs is coordinated by a control system in the print controller. The control system processes an algorithm to determine a sequence of releasing one or more print jobs stored in the rasterized job spool. The control system generates a job despool token and transmits the job despool token to a rasterized job handling system through the data stream of the raw print jobs (such as through the interpreter). The job despool token follows the normal data stream of print jobs through the print controller to the rasterized job handling system. Responsive to receiving and processing the job despool token, the rasterized job handling system releases the print job from the rasterized job spool to a print queue.

20 Claims, 5 Drawing Sheets

PRINT CONTROLLER USING A JOB DESPOOL TOKEN TO CONTROL THE RELEASE OF PRINT JOBS STORED IN A RASTERIZED JOB SPOOL

BACKGROUND OF THE INVENTION

1. Field of the Invention

The invention relates to the field of printer systems and, in particular, to print controllers that use job despool tokens to control the release of print jobs stored in a rasterized job spool.

2. Statement of the Problem

Printing systems associated with data processing enterprises generally include a localized print controller within the printing system. The print controller controls overall operation of the printing system including, for example, host interfacing, page description language interpretation, rasterising, and lower level process control or interface features of the print engine associated with the printing system. Host interaction may include appropriate adapters for coupling the printing system to one or more host systems utilizing one or more communication media and one or more communication protocols. Raw print jobs are received by the printing system from one or more attached host systems. The raw print jobs are generally encoded in the form of a page description language such as PostScript, HP PCL, IPDS, etc. In addition, raw print jobs may be encoded as simple character streams (ASCII) with no page description formatting associated therewith. In whatever form the raw print job may be encoded or formatted, the print controller within the printing system interprets the received information to generate rasterized images of pages represented by the raw print job. Each rasterized page image generally comprises a 2-dimensional array of picture elements ("pixels") that represent a corresponding formatted page of the raw print job. Each pixel may represent an encoded color value in accordance with the requirements of the particular raw print job encoding and the capabilities of the printing system on which the print job is to be printed. The process of interpreting the raw print job to generate corresponding rasterized page images is typically referred to as "ripping" and the sequences of rasterized pages may be referred to as a "ripped print job" or "rasterized print job".

The print controller may store or buffer one or more ripped print jobs in accordance with storage capabilities of the particular architecture of a particular print controller. Each ripped print job comprises one or more rasterized images, each referred to as a "logical page" of the ripped print job. The print controller may then apply the logical pages to a print engine (sometimes also referred to as an "imaging engine" or as a "marking engine"). The print engine then interacts with the imaging process to mark the printable medium (e.g., the sheet of paper) with the logical pages provided by the print controller. For example, where the print engine is an electro photographic imaging engine (e.g., a laser print engine), a laser or other optical imaging system transfers each logical page rasterized image through photosensitive materials to corresponding pixels on paper formed as particles of toner electro statically transferred to the paper.

Print controllers may have many desired configurations. In one generalized configuration, a print controller may include a raw job handling system, an interpreter, and a ripped job handling system. The raw job handling system communicates with one or more host systems to receive raw print jobs. The raw print jobs may be transmitted using various protocols that the raw job handling system can understand and process. The raw job handling system queues the raw print jobs for subsequent transfer to the interpreter. The raw job handling system may include a raw job spool that stores raw print jobs, temporarily or long term. The interpreter (sometimes referred to as a "rasterizer") receives and rips the raw print jobs received from the raw job handling system.

The ripped job handling system receives the ripped print jobs from the interpreter. Some of the ripped print jobs may be stored in a ripped job spool. The ripped job spool is a storage mechanism, such as a hard drive, generally used to store large print jobs. One example of print jobs that are typically spooled is continuous forms print jobs. Continuous forms print jobs are usually large print jobs that are spooled because of their size. Another example is print jobs that request to be spooled. Some jobs may request to be printed at a later time, such as at night or on a weekend, so these jobs may be stored on the ripped job spool.

The ripped print jobs that are not spooled in the ripped job handling system are queued up in a print queue. The print queue buffers ripped pages that will be subsequently transferred to the print engine in the order they are received. The print queue compensates for timing issues between the print engine and the interpreter, as the interpreter may take more processing time than the print engine. Thus, the print queue holds multiple print job pages so that the print engine is not waiting on the interpreter.

At some point, the ripped print jobs stored in the ripped job spool need to be released to the print queue and subsequently printed. Print controllers using ripped job spools are typically programmed by the manufacturer to release spooled print jobs according to a desired algorithm. For instance, the spooled print jobs may be released in the order they are received. It would be desirable to have a print controller that is more flexible in controlling the release of print jobs stored in the ripped job spool. Further, it would be desirable to allow a user to define the sequence or order of release of print jobs stored in the ripped job spool.

SUMMARY OF THE SOLUTION

The present invention solves the above and other related problems with a print controller and associated methods for controlling the sequence of release of print jobs stored on a rasterized job spool (e.g., ripped job spool). A print controller of the invention includes a control system adapted to process an algorithm to determine a sequence for releasing one or more print jobs from the rasterized job spool. The algorithm processed by the control system may be selected or defined by a user, which allows the user to change how print jobs are released from the rasterized job spool. Based on the algorithm, the control system generates a job despool token having a similar block format as a raw print job. The control system then inserts the job despool token in the raw job data stream and the job despool token flows with the print jobs downstream. A rasterized print job stored in the rasterized job spool is then released responsive to the job despool token.

By using the job despool token, the control system advantageously provides more flexible control of the release of print jobs stored in the rasterized job spool as compared to previous print controllers. The control system also advantageously allows for user-defined release of print jobs stored in the rasterized job spool.

In one embodiment of the invention, the print controller includes a raw job handling system, an interpreter, and a rasterized job handling system. The raw job handling system receives a plurality of raw print jobs from one or more host systems, and queues the raw print jobs in a raw job queue. The interpreter receives the raw print jobs from the raw job handling system, and rasterizes the raw print jobs to generate rasterized print jobs. The rasterized job handling system receives the rasterized print jobs from the interpreter. The rasterized job handling system stores one or more of the rasterized print jobs in a rasterized job spool. The logical pages for the rasterized print jobs that are not spooled in the rasterized job handling system are sent to a print queue.

The print jobs stored in the rasterized job spool need to be released to the print queue at some point for printing. According to the invention, a control system in the print controller controls and coordinates the release of the rasterized print jobs stored in the rasterized job spool. In operation, the control system processes an algorithm to determine a sequence to release one or more rasterized print jobs stored in the rasterized job spool. The control system may receive instructions from a user indicating which algorithm to use, and may receive instructions identifying which rasterized print job to release from the rasterized job spool. The control system generates a job despool token instructing the rasterized job handling system to release the rasterized print job from the rasterized job spool to the print queue. The control system then transmits the job despool token to the rasterized job handling system through the interpreter in the data stream of the raw print jobs. The job despool token flows with the normal data stream of print jobs through the print controller to the rasterized job handling system. The rasterized job handling system recognizes the job despool token as a release instruction for a rasterized print job stored in the rasterized job spool. Responsive to receiving and processing the job despool token, the rasterized job handling system releases the print job from the rasterized job spool to the print queue.

The invention may include other exemplary embodiments described below.

DESCRIPTION OF THE DRAWINGS

The same reference number represents the same element on all drawings.

DETAILED DESCRIPTION OF THE INVENTION

FIGS. 1-5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
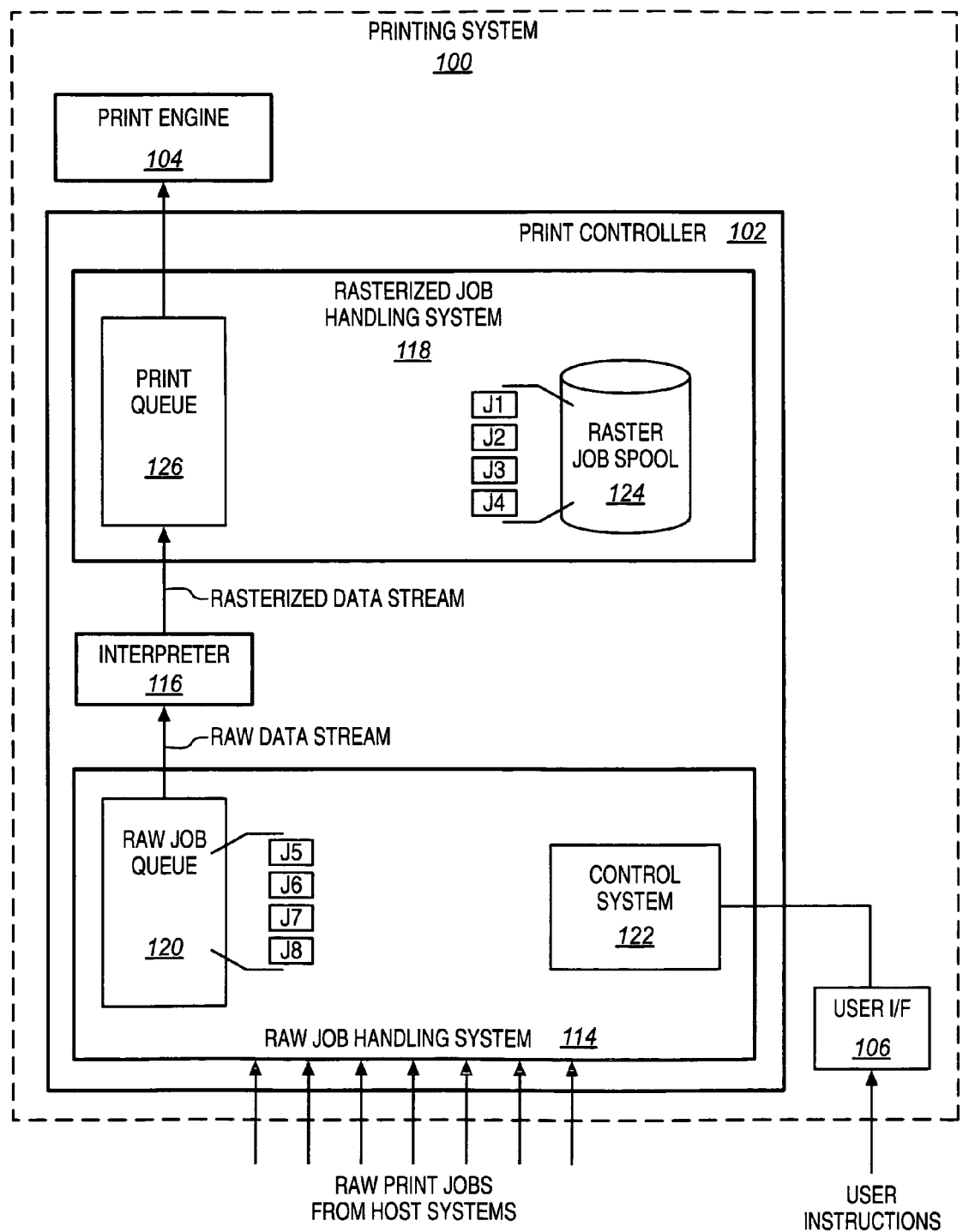
FIG. 1 illustrates a printing system in an exemplary embodiment of the invention.

FIG. 1 illustrates a printing system 100 in an exemplary embodiment of the invention. Printing system 100 comprises any system used to provide marks on a media, such as a continuous forms printer or a cut sheet page printer. In this embodiment, printing system 100 may include a print controller 102, a print engine 104, and a user interface 106. Print engine 104 comprises any system that controls an imaging process to mark a printable medium. User interface 106 may comprise a graphical user interface (GUI) or another type of user interaction mechanism that allows a user of printing system 100 to receive information and enter instructions. Printing system 100 may include other known components or systems not shown for the sake of brevity.

Print controller 102, in its generalized form, includes a raw job handling system 114, an interpreter 116, and a rasterized job handling system 118. Raw job handling system 114 communicates with one or more host systems (not shown) to receive raw print jobs. Raw job handling system 114 includes a raw job queue 120 and a raw job spool (not shown) that queues the raw print jobs for subsequent transfer to interpreter 116. Raw job handling system 114 also may include a control system 122 coupled to user interface 106. Control system 122 will be discussed in more detail below. Although control system 122 is shown as part of raw job handling system 114, control system 122 may be implemented in other portions of print controller 102 as a matter of design choice known to those of ordinary skill in the art.

Interpreter 116 comprises any system or device adapted to rasterize an image for printing. Interpreter 116 may comprise a PCL interpreter, a PostScript interpreter, and/or other types of interpreters.

Rasterized job handling system 118 comprises any system or device adapted to receive the rasterized print jobs from interpreter 116 and queue the rasterized print jobs for subsequent printing. Rasterized job handling system 118 may include a rasterized job spool 124 and a print queue 126. In this embodiment, rasterized job spool 124 comprises any storage mechanism, such as a hard drive, that is used to store spooled rasterized print jobs. The rasterized print jobs that are designated as "spooled" depend on the desired configuration. For instance, a host system transmitting a print job to a cut sheet page printer may designate which print jobs are to be spooled. In another example, all print jobs sent to a continuous forms printer may be spooled.

Print queue 126 buffers logical pages for rasterized print jobs that will be subsequently transferred to print engine 104 in the order they are received. The logical pages may originate directly from interpreter 116 or from despooled print jobs previously stored in rasterized job spool 124.

Print controller 102 is shown in FIG. 1 as comprised of separate components. These separate components may represent hardware used to implement print controller 102. One or more of the separate components may also represent logical blocks implemented in a processor executing instructions.

When in operation, raw job handling system 114 receives a plurality of raw print jobs from one or more host systems (not shown). The raw print jobs may be in different protocols that raw job handling system 114 is able to process and assemble into the appropriate data blocks. Raw job handling system 114 queues the raw print jobs in raw job queue 120.

Interpreter 116 receives the raw print jobs from raw job handling system 114 and rasterizes the raw print jobs. Rasterized job handling system 118 receives the rasterized print jobs from interpreter 116. Rasterized job handling system 118 stores one or more of the rasterized print jobs in rasterized job spool 124. For illustrative purposes, FIG. 1 shows four rasterized print jobs (J1-J4) stored in rasterized job spool 124.

The rasterized print jobs that are not spooled in rasterized job handling system 118 are sent to print queue 126 as logical pages. The logical pages in print queue 126 are processed by print engine 104 in the order that they are queued in a conventional manner.

Figure 2:
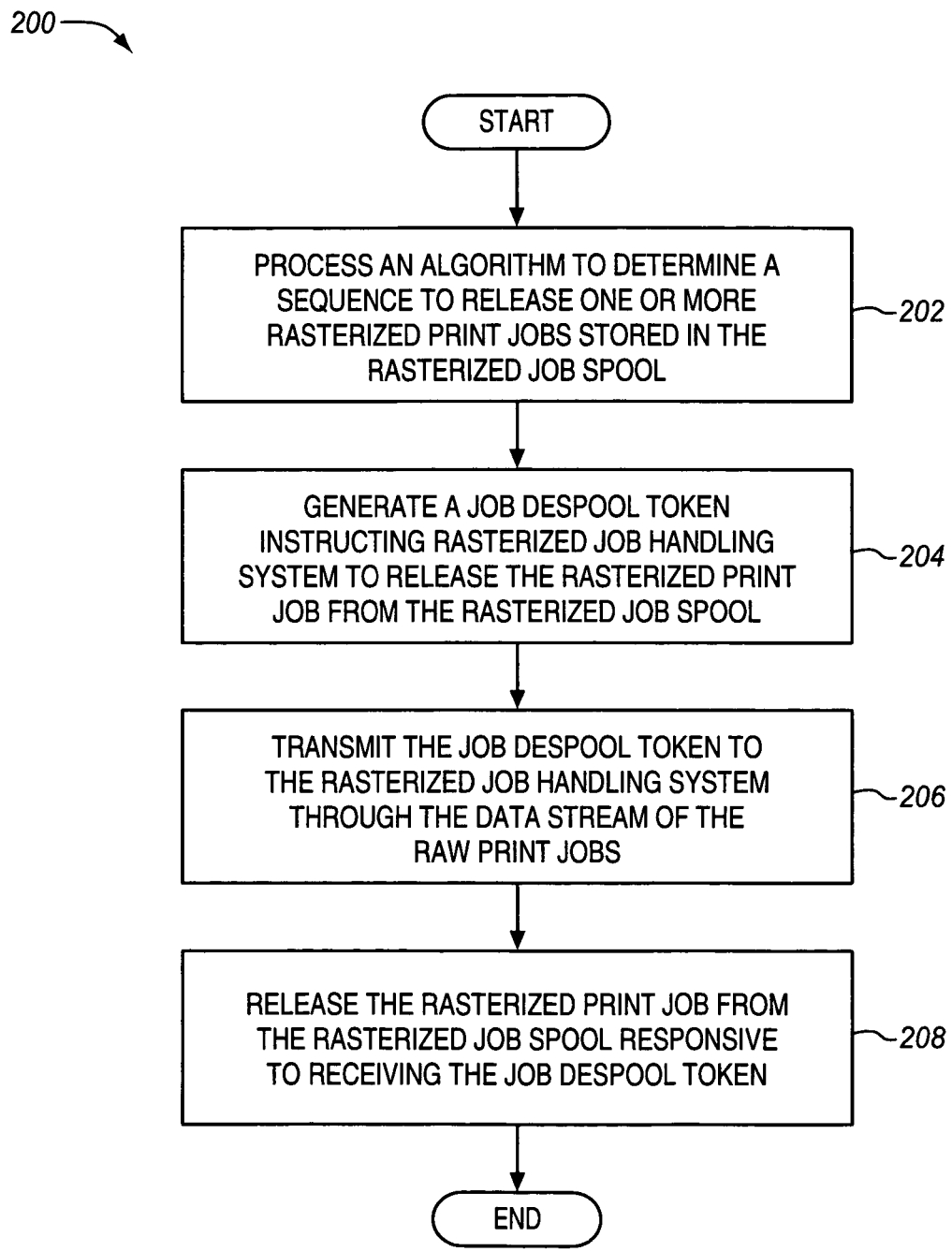
FIG. 2 is a flow chart illustrating a method of operating a print controller to release print jobs from a rasterized job spool in an embodiment of the invention.

The print jobs stored on rasterized job spool 124 (J1-J4) need to be released to print queue 126 at some point for printing. In accordance with aspects and features hereof, control system 122 controls and coordinates the release of the rasterized print jobs stored in rasterized job spool 124. FIG. 2 is a flow chart illustrating a method 200 of operating print controller 102 to release print jobs from rasterized job spool 124 in an embodiment of the invention. FIG. 2 shows the basic steps performed by print controller 102, and method 200 may include other steps not shown in FIG. 2.

In step 202, control system 122 processes an algorithm to determine a sequence to release one or more rasterized print jobs stored in rasterized job spool 124. The algorithm defines the sequence to release the rasterized print job(s). Control system 122 may initially process a default algorithm set by the manufacturer. However, control system 122 may receive instructions from a user through user interface 106 indicating which algorithm to use or indicating that a different algorithm is to be used. Control system 122 may also receive instructions from the user identifying which rasterized print job(s) to release from rasterized job spool 124. The user may be able to select one or more print jobs labeled on a display on user interface 106.

In step 204, control system 122 generates a job despool token instructing rasterized job handling system 118 to release the rasterized print job from rasterized job spool 124 to print queue 126. A job despool token comprises any code or string of characters understood by rasterized job handling system 118 as a release instruction. The job despool token may include a job identifier that identifies the particular rasterized print job to be released.

Figure 3:
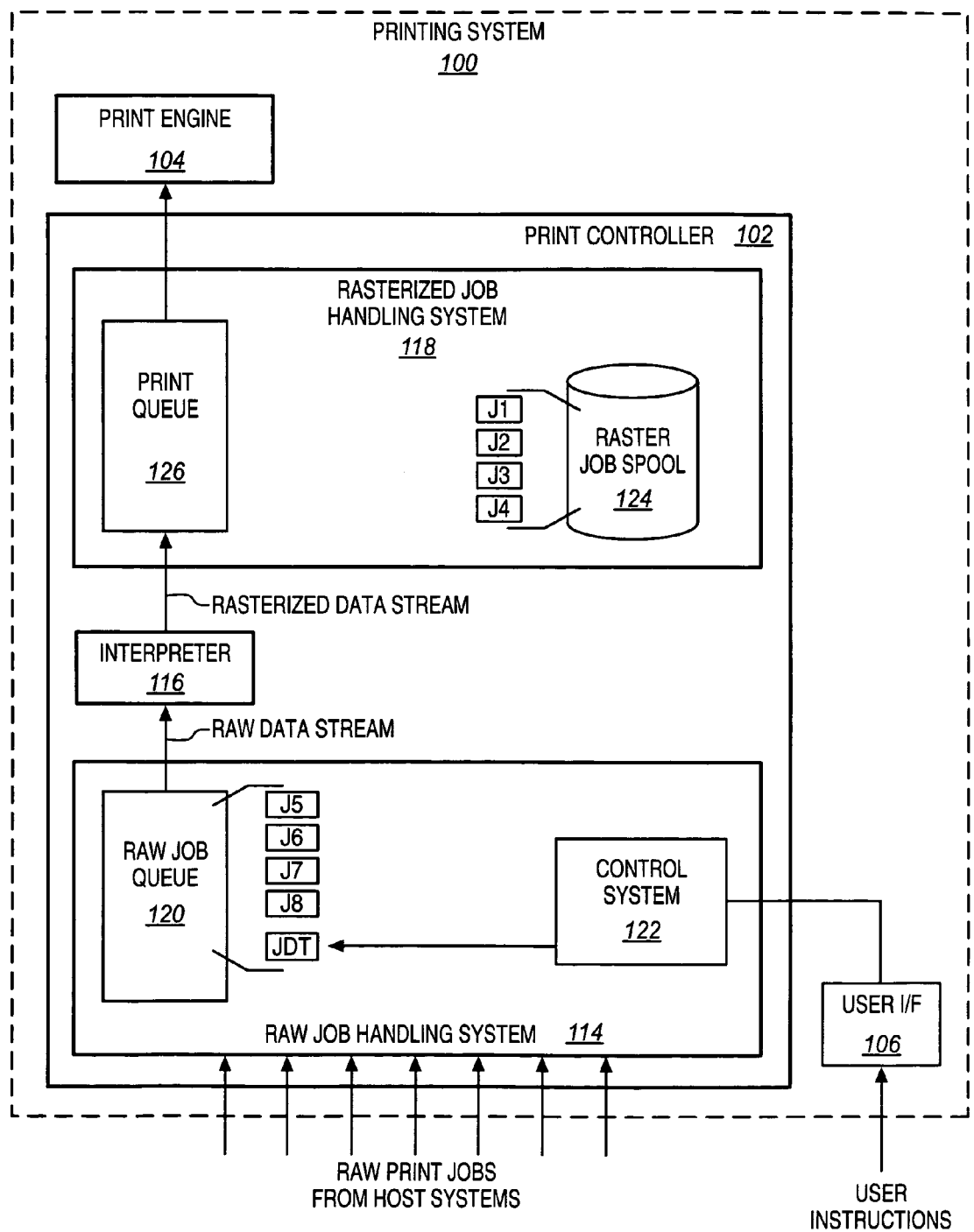
FIG. 3 illustrates the print controller with a job despool token being inserted in the raw data stream.

In step 206, control system 122 transmits the job despool token to rasterized job handling system 118 through interpreter 116 in the data stream of the raw print jobs. FIG. 3 illustrates the job despool token (JDT) being inserted in the raw data stream. For illustrative purposes, assume that raw print jobs J5-J8 are queued up in raw job queue 120. The job despool token (JDT) is inserted after job J8 and ahead of subsequent raw print jobs (not shown). The job despool token then follows the normal data stream of print jobs through print controller 102 to rasterized job handling system 118.

Figure 4:
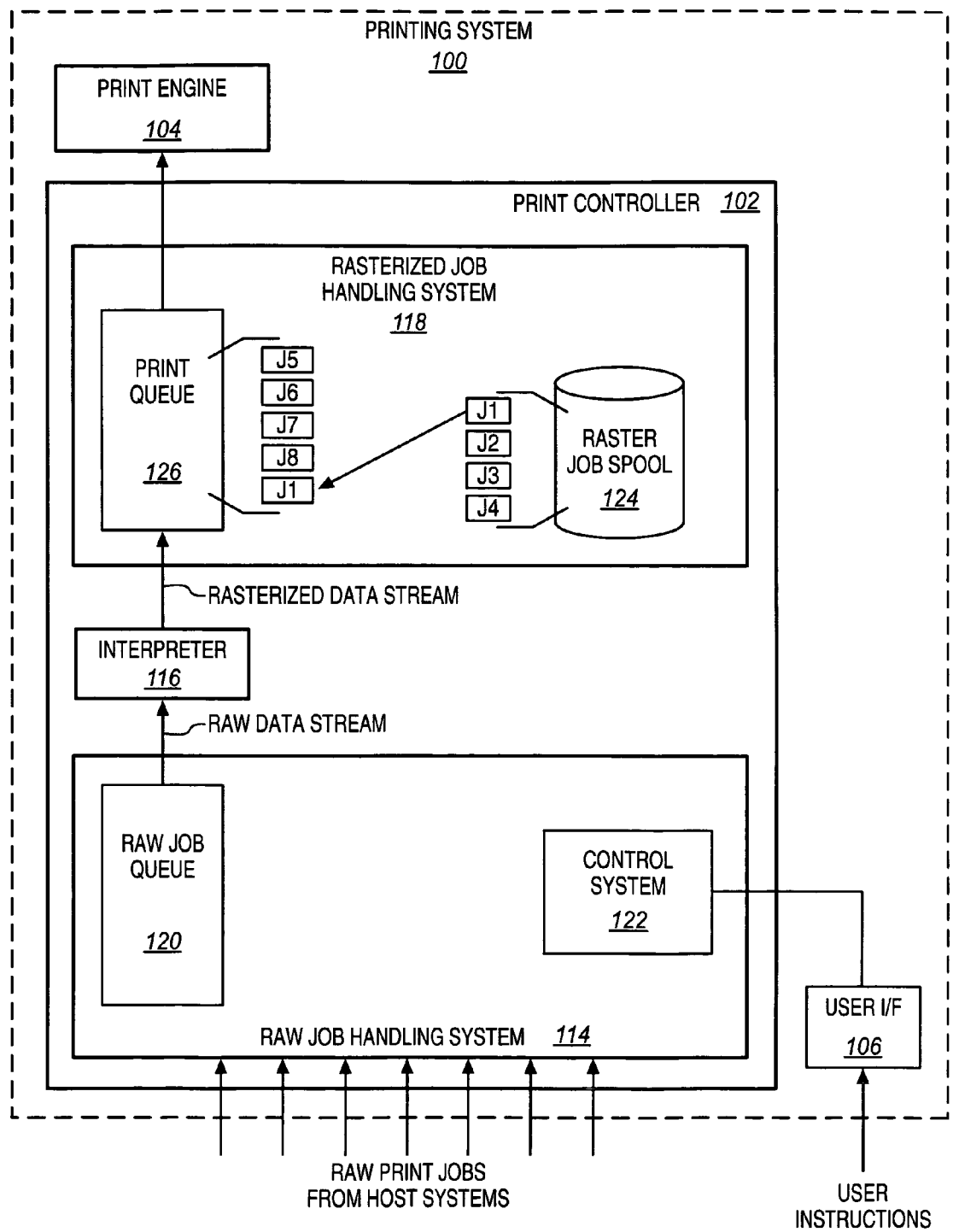
FIG. 4 illustrates the print job flow and job despool token flow through the print controller.

Jobs J5-J8 are processed first by interpreter 116. After being processed by interpreter 116, rasterized job handling system 118 sends the logical pages for print jobs J5-J8 to print queue 126. FIG. 4 illustrates the print job flow and job despool token (JDT) flow through print controller 102. Interpreter 116 then processes the job despool token and transmits it to rasterized job handling system 118.

Rasterized job handling system 118 recognizes the job despool token as a release instruction for a rasterized print job stored in rasterized job spool 124. Assume for this embodiment that the job despool token identifies job J1 to be released. Responsive to receiving and processing the job despool token, rasterized job handling system 118 releases the job J1 to print queue 126 in step 208. FIG. 4 illustrates the print job J1 being released to print queue 126. Job J1 is released to print queue 126 and the logical pages for job J1 are queued up after the logical pages for print job J8. The logical pages for job J1 will then be sent to print engine 104 in order and printed.

Print controller 104 advantageously provides a more flexible controller for release of print jobs from rasterized job spool 124. A user is able to select one or more print jobs from rasterized job spool 124 that are to be released. Control system 122 then sends the job despool token through the raw job data stream to control the sequence of release of the print jobs from rasterized job spool 124. The user may advantageously change the order of release of the spooled print jobs through user interface 106, which gives the user flexibility as to which jobs to print and when.

Figure 5:
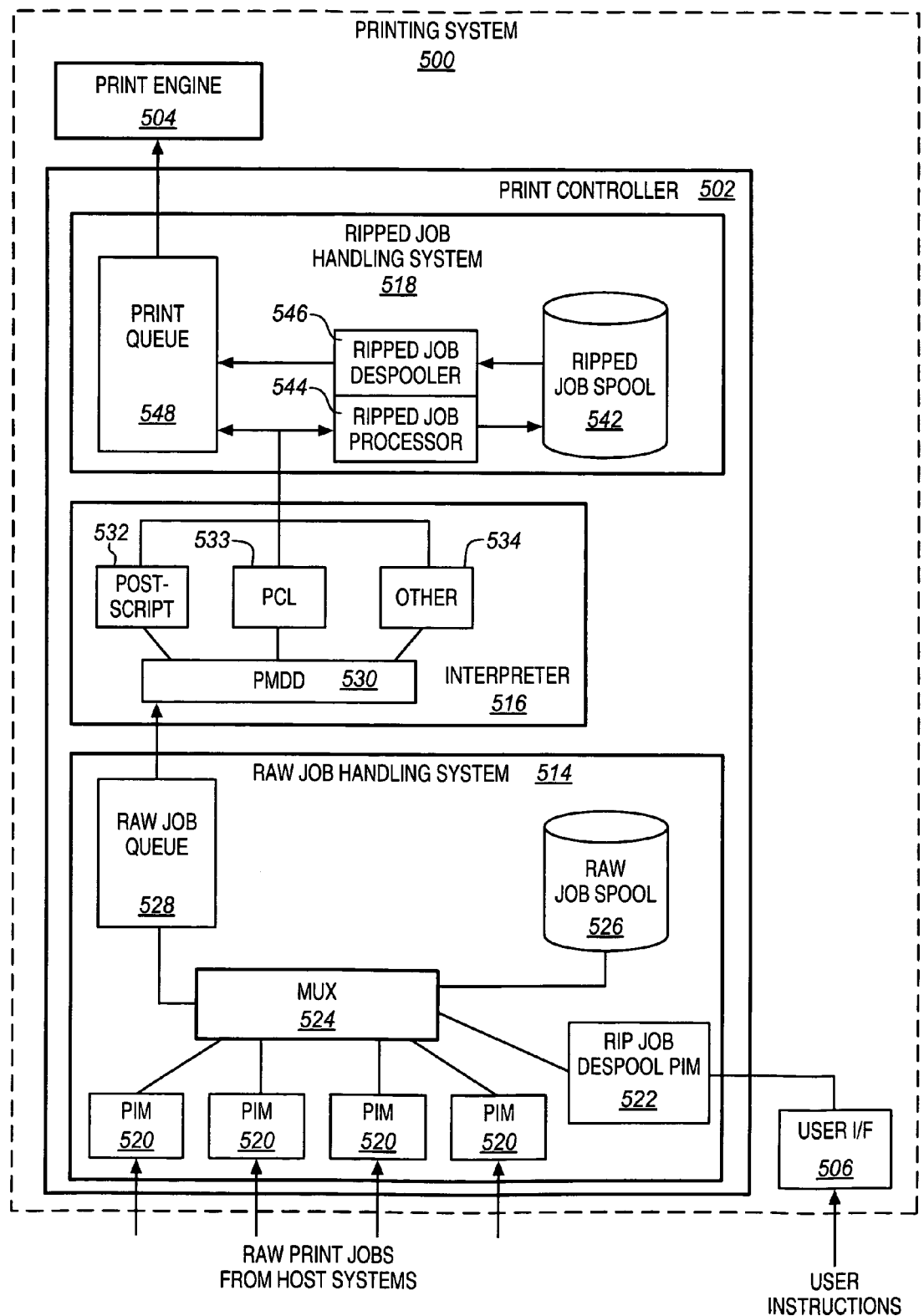
FIG. 5 illustrates a more detailed embodiment of a printing system.

FIG. 5 illustrates a more detailed embodiment of an exemplary printing system 500. Printing system 500 may include a print controller 502, a print engine 504, and a user interface 506. Print controller 502 may include, as in the previous figures, a raw job handling system 514, an interpreter 516, and a ripped job handling system 518. In this embodiment, "rasterized" and "ripped" are used interchangeably.

Raw job handling system 514 may include a plurality of Protocol Interface Modules (PIM) 520 adapted to communicate with a plurality of host systems (not shown). Raw job handling system 514 also may include a rip job despool PIM 522 that receives user instructions from user interface 506. Rip job despool PIM 522 represents the control system described in the previous figures. Raw job handling system 514 also may include a raw job spool 526 and a raw job queue 528 that queue raw print jobs for subsequent transfer to interpreter 516.

Interpreter 516 may include a PDL/Mux Data Delivery (PMDD) 530, a PostScript interpreter 532, a PCL interpreter 533, and another interpreter 534. PMDD 530 is a pre-handler to the interpreters 532-534. Interpreters 532-534 rip or rasterize the raw print jobs to generate ripped print jobs.

Ripped job handling system 518 may include a ripped job spool 542, a ripped job processor 544, and a ripped job despooler 546. Ripped job processor 544 is adapted to receive the ripped print jobs to be spooled, and store those ripped print jobs in ripped job spool 542. As previously described, ripped job spool 542 is a storage mechanism, such as a hard drive. Ripped job despooler 546 is adapted to despool ripped print jobs stored on the ripped job spool 542 responsive to control from rip job despool PIM 522. The ripped print jobs are despooled to print queue 548 for subsequent transfer to print engine 104.

Print queue 548 buffers the logical pages of ripped print jobs that will be subsequently transferred to print engine 504 in the order they are received. Print queue 548 compensates for timing issues between print engine 504 and interpreters 532-534.

When in operation, PIMs 520 in raw job handling system 514 receive raw print jobs from one or more host systems (not shown). The raw print jobs may use different protocols that raw job handling system 514 is able to process and assemble into the appropriate data blocks. PIMs 520 send the raw print jobs to MUX 524. MUX 524 sends the raw print jobs that are to be immediately processed to raw job queue 528. MUX 524 sends the raw print jobs that are to be spooled to raw job spool 526. Raw job queue 528 transmits the queued raw print jobs to interpreter 516 for processing.

PMDD 530 receives the raw print jobs and pre-processes the raw print jobs for rasterizing. PMDD 530 then sends the print jobs to the appropriate interpreter 532-534 depending on the format of the print jobs. Interpreters 532-534 rip or rasterize the raw print jobs to generate ripped print jobs, and forward the ripped print jobs to ripped job handling system 518.

In ripped job handling system 518, ripped print jobs that are to be spooled are sent to ripped job processor 544. Ripped job processor 544 stores the ripped print jobs in ripped job spool 542. The ripped print jobs that are not spooled in ripped job handling system 518 are sent to print queue 548. The logical pages in print queue 548 are processed by print engine 504 in the order that they are queued in a conventional manner.

The print jobs stored on ripped job spool 542 need to be released to print queue 548 at some point for printing. In accordance with aspects and features hereof, rip job despool PIM 522 (the control system) controls and coordinates the release of the ripped print jobs stored in ripped job spool 542. To begin, user interface 506 receives instructions from a user. The instructions tell print controller 502 how to release one or more print jobs stored on the ripped job spool 542. User interface 506 forwards the user instructions to rip job despool PIM 522.

Responsive to the user instructions, rip job despool PIM 522 processes an algorithm to determine a sequence to release one or more ripped print jobs from ripped job spool 542. Rip job despool PIM 522 may process any desired algorithm for job release. The user instructions may indicate a particular algorithm to process. The user instructions may instead or additionally provide one or more processing parameters that are input into the algorithm to produce a desired result of the user. Described below are three exemplary algorithms used to control release, but the scope of the invention is not limited to these three algorithms.

One algorithm (the "FIRST" algorithm) may define that a particular ripped print job in ripped job spool 542 is to be released ahead of all other print jobs. Responsive to rip job despool PIM 522 processing this algorithm, rip job despool PIM 522 releases a ripped print job and ripped job despooler 546 prints the released printer job ahead of other print jobs. For instance, rip job despool PIM 522 may alter one or more attributes of a ripped print job in a global job monitor (not shown) (e.g., a database storing information and attributes for print jobs of print system 500). If ripped job despooler 546 queries the job monitor, the job monitor will indicate that the ripped print job is to be released from ripped job spool 542.

Another algorithm (the "SEQUENTLAL" algorithm) may define that a particular ripped print job in ripped job spool 542 is to be released in sequence with other print jobs and not released ahead of other print jobs. Responsive to rip job despool PIM 522 processing this algorithm, rip job despool PIM 522 generates a job despool token instructing ripped job despooler 546 to release an identified ripped print job from ripped job spool 542 to print queue 548. The job despool token may include a job identifier that identifies the particular ripped print job to be released. Rip job despool PIM 522 transmits the job despool token to raw job queue 528 in order to insert the job despool token in the raw job data stream. The job despool token is inserted between two raw print jobs. Rip job despool PIM 522 formats the job despool token as a data block that is properly handled by the downstream components.

In the raw job data stream, the job despool token passes through interpreter 516 to ripped job handling system 518. Ripped job despooler 546 receives the job despool token and recognizes the job despool token as an instruction to release a ripped print job from ripped job spool 542. Ripped job despooler 546 then identifies the proper ripped print job and releases the ripped print job from ripped job spool 542 to print queue 548.

The ripped print job is released in "sequence" with other print jobs because the job despool token is inserted in the raw job data stream. The jobs ahead of the job despool token in the raw data stream are processed first and queued up for printing in print queue 548. When the job despool token is received, the ripped print job identified in the job despool token is released, and the logical pages of the job are put in print queue 548 behind the logical pages of the aforementioned print jobs. Thus, the ripped print job is released in a particular order depending on where the job despool token is inserted in the raw data stream.

Another algorithm (the "PARALLEL" algorithm) may define that a particular ripped print job in ripped job spool 542 is to be released when print engine 504 is idle, or released in sequence (which ever one happens first). The PARALLEL algorithm is a combination of the FIRST algorithm and the SEQUENTIAL algorithm. Responsive to rip job despool PIM 522 processing this algorithm, rip job despool PIM 522 alerts ripped job despooler 546 that an identified ripped print jobs is to be released next from ripped job spool 542 if print engine 504 is idle, and rip job despool PIM 522 also generates a job despool token instructing ripped job despooler 546 to release the ripped print job from ripped job spool 542 to print queue 548. The job despool token forces the release of the ripped print job if the ripped print job is not released previously by ripped job despooler 546.

These above exemplary algorithms have an identified ripped print job to release, possibly as selected by the user. The user interface 506 may display a list of ripped jobs that the user may select for release. Other possible algorithms may select a particular print job. For instance, the algorithm may select the largest print job in ripped job spool 542, may select the smallest print job, may select the oldest print job, may select the most recent print job, etc.

The invention can take the form of an entirely hardware embodiment, an entirely software embodiment, or an embodiment containing both hardware and software elements. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/0 controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print controller for a printing system, comprising:
a raw job handling system adapted to receive and queue raw print jobs;
an interpreter adapted to receive the raw print jobs from the raw job handling system, and process the raw print jobs to generate rasterized print jobs;
a rasterized job handling system that includes a rasterized job spool, wherein the rasterized job handling system is adapted to receive the rasterized print jobs from the interpreter, and store at least one of the rasterized print jobs in a rasterized job spool; and
a control system adapted to process an algorithm to determine a sequence to release a rasterized print job stored in the rasterized job spool, generate a job despool token instructing the rasterized job handling system to release the rasterized print job from the rasterized job spool to a print queue, and transmit the job despool token to the rasterized job handling system through the interpreter in the data stream of the raw print jobs;
wherein the rasterized job handling system is adapted to release the rasterized print job from the rasterized job spool to the print queue responsive to receiving the job despool token.

2. The print controller of claim 1 wherein:
the control system is further adapted to receive user instructions identifying which rasterized print job stored in the rasterized job spool to release.

3. The print controller of claim 1 wherein:
the control system is further adapted to receive user instructions indicating which algorithm to use to determine the sequence to release the rasterized print job stored in the rasterized job spool.

4. The print controller of claim 1 wherein the job despool token includes a job identifier that identifies the rasterized print job to be released.

5. The print controller of claim 1 wherein the control system inserts the job despool token between two raw print jobs in the raw print job data stream.

6. The print controller of claim 5 wherein the job despool token is formatted as a data block between the raw print jobs.

7. The print controller of claim 1 wherein the print controller is for a continuous forms printing system or a cut sheet page printing system.

8. A printing system, comprising:
a user interface;
a print engine; and
a print controller comprising:
a raw job handling system adapted to receive and queue raw print jobs;
an interpreter adapted to receive the raw print jobs from the raw job handling system, and process the raw print jobs to generate rasterized print jobs;
a rasterized job handling system that includes a rasterized job spool, wherein the rasterized job handling system is adapted to receive the rasterized print jobs from the interpreter, and store at least one of the rasterized print jobs in a rasterized job spool; and
a control system adapted to process an algorithm to determine a sequence to release a rasterized print job stored in the rasterized job spool, generate a job despool token instructing the rasterized job handling system to release the rasterized print job from the rasterized job spool to a print queue, and transmit the job despool token to the rasterized job handling system through the interpreter in the data stream of the raw print jobs;
wherein the rasterized job handling system is adapted to release the rasterized print job from the rasterized job spool to the print queue responsive to receiving the job despool token.

9. The printing system of claim 8 wherein:
the control system is further adapted to receive user instructions through the user interface identifying which rasterized print job stored in the rasterized job spool to release.

10. The printing system of claim 8 wherein:
the control system is further adapted to receive user instructions through the user interface indicating which algorithm to use to determine the sequence to release the rasterized print job stored in the rasterized job spool.

11. The printing system of claim 8 wherein the job despool token includes a job identifier that identifies the rasterized print job to be released.

12. The printing system of claim 8 wherein the control system inserts the job despool token between two raw print jobs in the raw print job data stream.

13. The printing system of claim 12 wherein the job despool token is formatted as a data block between the raw print jobs.

14. The printing system of claim 8 wherein the printing system comprises a continuous forms printing system or a cut sheet page printing system.

15. A method of operating a print controller for a printing system, the print controller comprising a raw job handling system that receives and queues raw print jobs, an interpreter that receives the raw print jobs from the raw job handling system and processes the raw print jobs to generate rasterized print jobs, and a rasterized job handling system that includes a rasterized job spool, wherein the rasterized job handling system is adapted to receive the rasterized print jobs from the interpreter, and store at least one of the rasterized print jobs in the rasterized job spool, the method comprising:
processing an algorithm to determine a sequence to release a rasterized print job stored in the rasterized job spool;
generating a job despool token instructing the rasterized job handling system to release the rasterized print job from the rasterized job spool to a print queue;
transmitting the job despool token to the rasterized job handling system through the interpreter in the data stream of the raw print jobs; and
releasing the rasterized print job from the rasterized job spool to the print queue responsive to receiving the job despool token.

16. The method of claim 15 further comprising:
receiving user instructions identifying which rasterized print job stored in the rasterized job spool to release.

17. The method of claim 15 further comprising:
receiving user instructions indicating which algorithm to use to determine the sequence to release the rasterized print job stored in the rasterized job spool.

18. The method of claim 15 wherein the job despool token includes a job identifier that identifies the rasterized print job to be released.

19. The method of claim 15 wherein transmitting the job despool token comprises:
inserting the job despool token between two raw print jobs in the raw print job data stream.

20. The method of claim 19 wherein the job despool token is formatted as a data block between the raw print jobs.

\* \* \* \* \*